United States Patent
Camenisch et al.

(10) Patent No.: US 8,135,649 B2
(45) Date of Patent: Mar. 13, 2012

(54) METHOD AND SYSTEM FOR LINKING AN ANONYMOUS ELECTRONIC TRADE ORDER TO AN IDENTITY OF A TRADER

(75) Inventors: Jan Leonhard Camenisch, Thalwil (CH); Christopher Mark Kenyon, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 12/544,241

(22) Filed: Aug. 20, 2009

(65) Prior Publication Data

US 2009/0313172 A1    Dec. 17, 2009

Related U.S. Application Data

(62) Division of application No. 11/642,013, filed on Dec. 19, 2006, now Pat. No. 7,835,978.

(30) Foreign Application Priority Data

Dec. 23, 2005  (EP) ..................................... 05112953

(51) Int. Cl.
*G06Q 20/00* (2006.01)
(52) U.S. Cl. ...................................................... 705/74
(58) Field of Classification Search ...................... 705/74
See application file for complete search history.

(56) References Cited

U.S. PATENT DOCUMENTS

| | | | | |
|---|---|---|---|---|
| 4,701,844 | A | * | 10/1987 | Thompson et al. ........... 711/119 |
| 7,774,261 | B1 | * | 8/2010 | Mintz et al. ..................... 705/37 |
| 7,778,916 | B2 | * | 8/2010 | Burkhardt et al. .............. 705/37 |
| 2001/0042037 | A1 | * | 11/2001 | Kam et al. ....................... 705/36 |
| 2002/0007335 | A1 | * | 1/2002 | Millard et al. ................... 705/37 |
| 2002/0023055 | A1 | * | 2/2002 | Antognini et al. .............. 705/40 |
| 2002/0152152 | A1 | * | 10/2002 | Abdelnur et al. ............... 705/37 |
| 2003/0014351 | A1 | * | 1/2003 | Neff et al. ........................ 705/37 |
| 2003/0177086 | A1 | * | 9/2003 | Gomber et al. ................. 705/37 |
| 2004/0078317 | A1 | * | 4/2004 | Allen et al. ...................... 705/37 |
| 2004/0117292 | A1 | * | 6/2004 | Brumfield et al. .............. 705/37 |
| 2006/0153365 | A1 | * | 7/2006 | Beeson ............................ 380/30 |
| 2006/0161494 | A1 | * | 7/2006 | Littlewood ....................... 705/37 |
| 2009/0276348 | A1 | * | 11/2009 | Kessler et al. ................... 705/37 |
| 2009/0276365 | A1 | * | 11/2009 | Wilson ......................... 705/36 R |

* cited by examiner

*Primary Examiner* — Andrew J. Fischer
*Assistant Examiner* — C. Aaron McIntyre
(74) *Attorney, Agent, or Firm* — William Stock; Anne Vachon Dougherty (57) ABSTRACT

A method for automatically linking an anonymous electronic trade order having an order quantity (q) to an identity of a trader by providing an identity marker (s) of the trader; embedding the identity marker (s) by splitting the anonymous trade order into a number (n) of trade orders each having a corresponding order quantity x (i) to generate a trade order set; and placing the generated trade order set in an electronic order book.

8 Claims, 9 Drawing Sheets

Trade Order

| Object Iidentifier    O - ID |
|---|
| Trade Direction Indicator (buy / sell)   tdi |
| Quantity   q |
| Time Stamp   ts |
| Price Real Number   p |

Fig. 4A

| IBM |
|---|
| Buy |
| 10.000 shares |
| December 16, 2005         19:22 |
| $ 80.13 Per Share |

METHOD AND SYSTEM FOR LINKING AN ANONYMOUS ELECTRONIC TRADE ORDER TO AN IDENTITY OF A TRADER

CROSS REFERENCE TO RELATED APPLICATIONS

This application is a divisional application of U.S. patent application Ser. No. 11/642,013 filed Dec. 19, 2006 now U.S. Pat. No. 7,835,978.

FIELD OF THE INVENTION

The invention relates to a method for automatically linking an anonymous electronic trade order having an order quantity to an identity of a trader such as a share trader.

BACKGROUND OF THE INVENTION

Electronic trading is a mode of trading that uses information technology to bring together a buyer and a seller of a tradable object through electronic media to create a virtual market place. Originally stock markets used to be a physical location where buyers and sellers met and negotiated. With the improvement of the communication technology the need for physical co-location no longer is of any importance as the buyers and sellers can electronically exchange trade orders as well as negotiate with each other from a remote location. An increasing number of financial assets are traded in "limit order" markets around the world. In such markets traders can submit market orders and limit orders. Market orders trade at the best available price posted by previously submitted limit orders which make up the electronic limit order book. A limit trade order is a conditional buy or sell at a pre-specified price and is stored in the electronic book until cancelled or hit by an incoming market order. A limit trade order trades at a better price than a market trade order. However, there are two types of costs to submitting a limit order. First, the order may fail to be executed. Second, the limit order may execute against a market order that is based on private information (adverse selection). In this case, limit orders trade at the wrong side of the market. This is also referred to as a picking-off risk.

Share trading is anonymous in most major stock exchanges in that only the price p and quantity q for bids and asks are visible in the electronic order book. Traders include in their trading decisions allowance for adverse selection, i.e. the risk that posted bids and asks include private information about future stock price movements. Thus, trading with anonymous orders has the consequence that traders wishing to trade for non informational reasons, i.e. for liquidity, have also to pay an adverse selection penalty.

Figure 1:
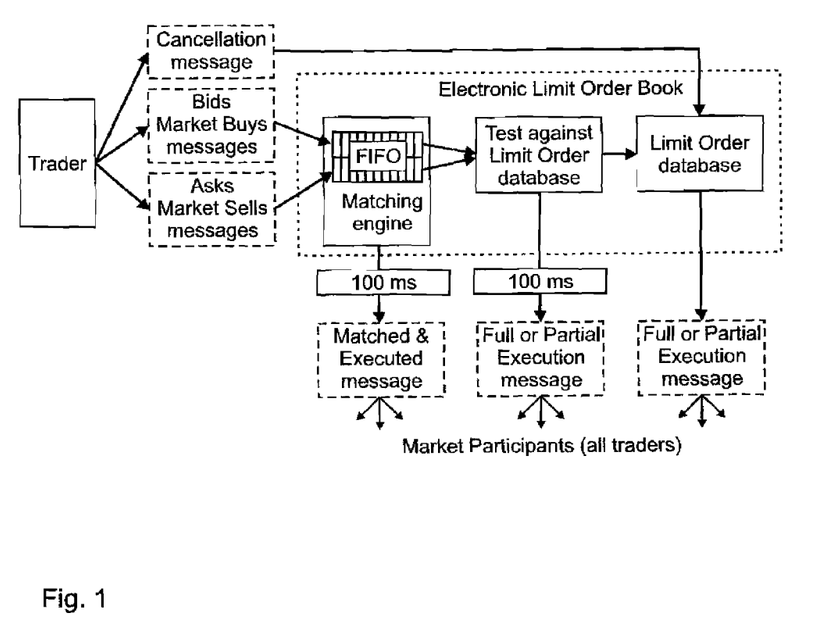
FIG. 1 shows a diagram of a conventional electronic order book.

FIG. 1 shows a typical limit electronic order book as employed in most stock markets. Electronic order books are real time systems that typically have latencies from order arrival to action, i.e. execution or placement of orders on the book. In a typical electronic order book a trader can communicate by means of five message types, i.e. market buy, market sell, bid, offer and cancel. The bid and offer messages contain prices as well as quantities. Market buys and sells are executed immediately or cancelled. All messages are cancelled at the end of each trading day. As long as the orders are in the FIFO-buffer they are matched against each other. Any exact match of two orders on price and quantity is executed. Unmatched orders are executed immediately against the book in a strict price and time priority if possible, or placed on the book with a time-stamp. A confirmation message is then returned to the trader with an order confirmation number that can be used for cancellation.

The trading occurs on screen based anonymous electronic markets such as NASDAQ or more recently alternative creating platforms such as INET or ECN. These venues are generally called "downstairs markets". Trading is anonymous in that only trade direction (buy/sell), price p, quantity q and a time-stamp are visible.

For large traders so called "upstairs markets" exist and traders with reputations for non informational trading obtain improved prices. Prices in upstairs markets are better for the traders because the participants do not have to pay the worst selection costs of trading with potentially better informed counter parties. In these upstairs markets it is vital for the traders to have a reputation that they are trading for non informational purposes, e.g. liquidity, in order to obtain improved prices.

However, the upstairs markets have the disadvantage that they are not automated and do not have the participation of the full trader population. Because of the existence of upstairs markets the anonymous electronic markets, i.e. the downstairs markets, loose liquidity and value streams because traders cannot build an identity linked reputation in these downstairs markets in order to obtain improved prices.

Accordingly, it is an aspect of the present invention to provide a method and a system to link anonymous trade orders with an identity of the respective trader.

SUMMARY OF THE INVENTION

The invention provides a method for automatically linking an anonymous electronic trade order having an order quantity to an identity of a trader comprising the steps of providing an identity marker (s) of said trader; embedding the identity marker (s) by splitting the anonymous trade order into a number (n) of trade orders each having a corresponding order quantity x (i) to generate a trade order set; and placing the generated trade order set in an electronic order book.

In one embodiment of the method according to the present invention the identity marker is derived from a generated cryptographic signature of the trader.

In an alternative embodiment of the method according to the present invention the identity marker is derived from a generated random number.

An advantage of the method according to the present invention resides in that it can use the existing platform of the electronic order books used in conventional electronic markets.

The embedding is performed in a preferred embodiment either via a direct mapping algorithm or a constructive embedding algorithm.

In a preferred embodiment the cryptographic signature is generated by an elliptic curve signature generation algorithm.

In the following preferred embodiments of the method and system for automatically linking an anonymous electronic trade order to an identity of a trader are described with reference to the enclosed figures.

DETAILED DESCRIPTION OF THE PREFERRED EMBODIMENTS

Figure 2:
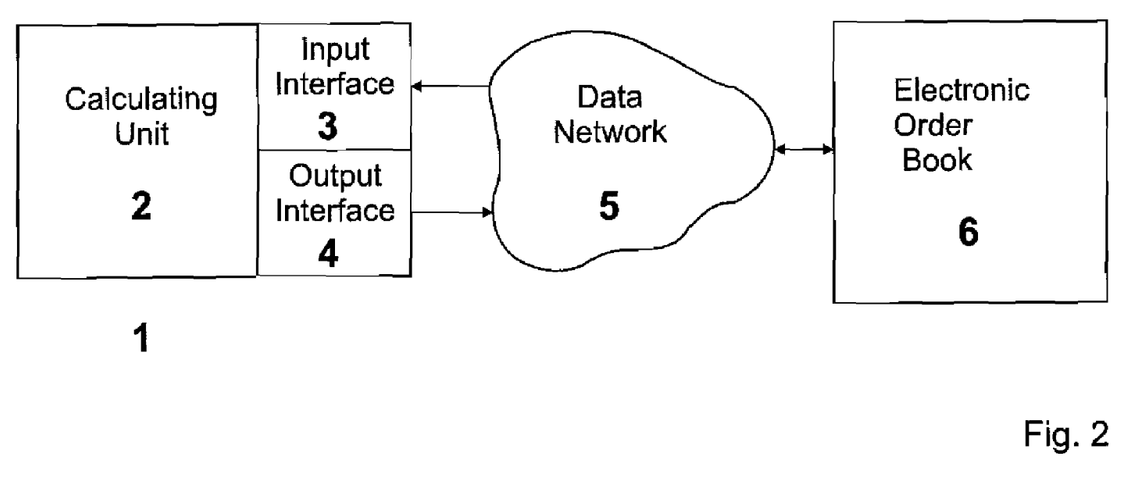
FIG. 2 shows an embodiment of the computer system according to the present invention.

As can be seen from FIG. 2 a computer system 1 according to a preferred embodiment of the present invention comprises a calculating unit 2, an input interface 3 and an output interface 4. The interfaces 3, 4 are connected in a preferred embodiment to a data network 5. Further, an electronic order book 6 is also connected to the data network 5. The data network 5 is formed in a preferred embodiment by the internet. To the data network 5 a plurality of traders such as brokers and clients have an access to the electronic order book 6 and the computer system 1.

In an alternative embodiment the computer system 1 is integrated into the electronic order book 6.

Figure 4A:
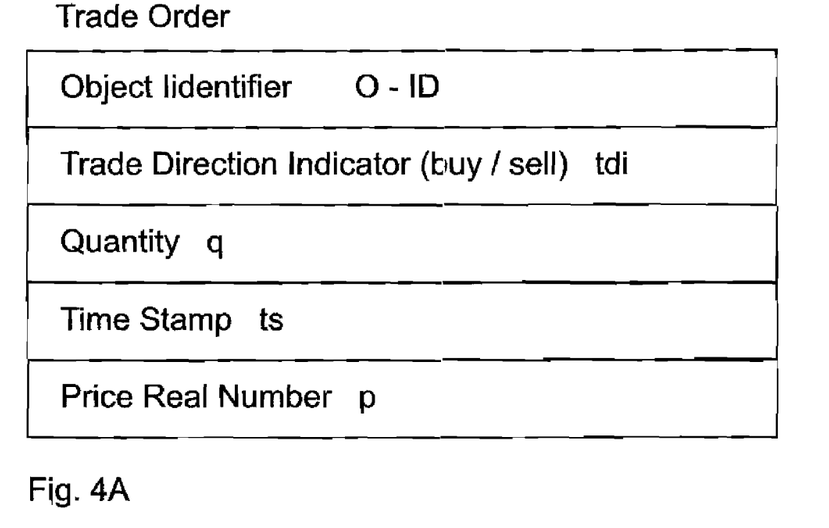
FIG. 4A, 4B are diagrams to illustrate the data structure of an electronic trade order as employed by the method and system according to the present invention.
Figure 4B:
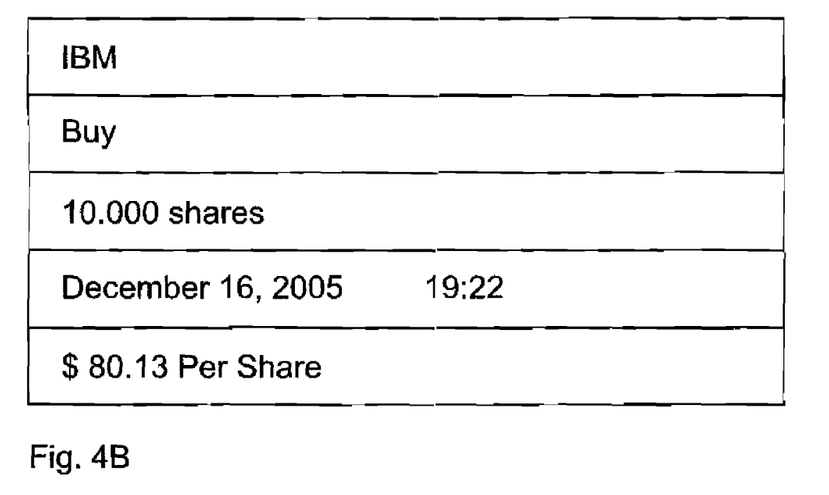

Via the input interface 3 the computer system 1 receives anonymous electronic trade orders as shown in FIGS. 4A, 4B. Each electronic trade order comprises an object identifier O-ID identifying an object, a trade direction indicator TDI indicating whether the object is to be bought or to be sold, an integer number q indicating the quantity of the bid or offer, i.e. the number of traded objects, a time-stamp TS indicating the time when the electronic order is placed in the electronic order book and a real number p indicating a price for each unit of the identified object. The object can be any object and in particular a share of a company.

Figure 3:
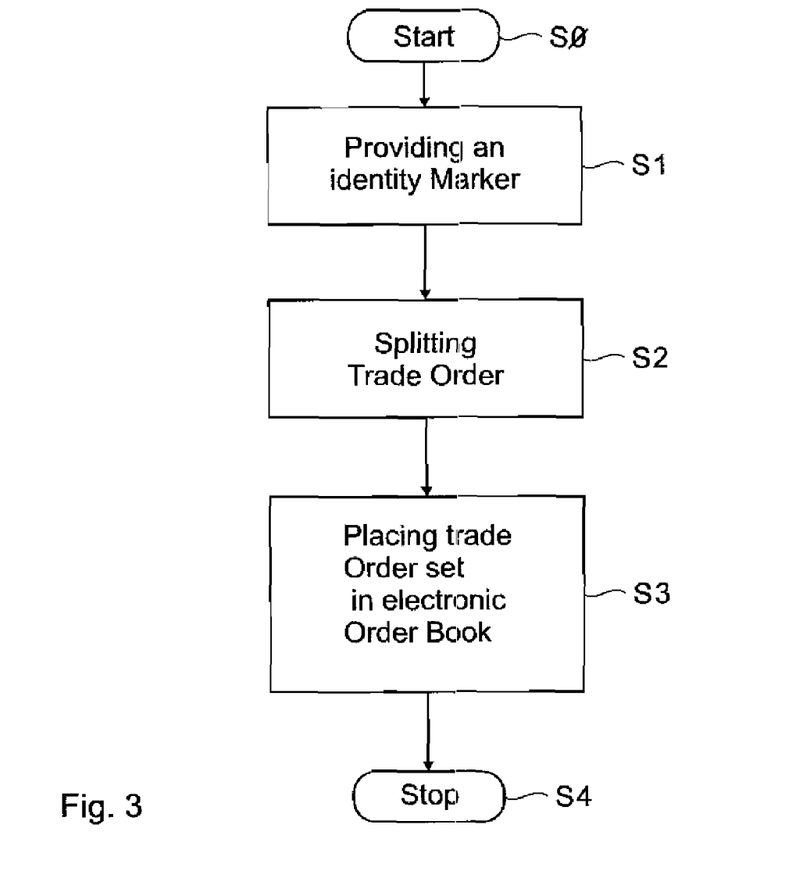
FIG. 3 shows the flow chart diagram of a preferred embodiment of the method according to the present invention.

When the calculating unit 2 of the computer system 1 receives an anonymous trade order from the network 5 via the input interface 3 it performs a method for automatically linking the received anonymous electronic trade order to an identity of a trader by performing the method as shown in FIG. 3.

After a starting step S0 an identity marker S of a trader is provided in step S1. The provided identity marker S is formed in a preferred embodiment by a generated cryptographic signature of the trader. The cryptographic signature S of the trader is generated by using a private key of the respective trader.

In an alternative embodiment, the identity marker of the trader is formed by generating a random number.

In a further step S2 the provided identity marker is embedded by splitting the received anonymous trade order into a number n of trade orders each having a corresponding order quantity xi to generate a set of trade orders. The sum of the order quantities xi of the split orders is equal to the order quantity q of the original anonymous electronic order received by the computer system 1 via the input interface 3, or within a range of e.g. 5 percent of the order quantity q.

The generated trade order set is placed in a step S3 by the computer system 1 via the output interface 4 and the data network 5 in the electronic order book 6.

With the method according to the present invention as shown in FIG. 3 it is possible to link specific trade orders to an identity of a trader. This is done by embedding an identity marker identifying this trader in the electronic trade orders. Either a random number is embedded and made available authentically, e.g. by signing it and then publishing the signature, or a signature number is embedded in the trades themselves. In both cases a public key is made available on an alternative communication channel. A trader may have different identities related to different reputations that the trader wishes to support. The method according to the present invention makes hidden information visible. The method according to the present invention can be used for both placing trade orders on the electronic order book 6 and for picking volume from the order book 6. Both parties of a trade can identify themselves by using the method according to the present invention.

In one embodiment of the method for automatically linking an anonymous electronic trade order having a given order quantity to an identity of a trader a first cryptographic signature (S) is generated by the trader using a private key of the trader. Then, the cryptographic signature (S) is embedded by splitting the anonymous trade order into a number n of trade orders each having a corresponding quantity xi to generate a trade order set. Finally, the generated trade order set is placed in the electronic order book 6. The public key and the identity of the trader is made available via a separate communication channel. For instance, the public key and the identity of the trader is placed on a web site of the data network 5. The sum of the order quantities xi of the split order is essentially equal to the order quantity q of the anonymous electronic trade order.

In a preferred embodiment the cryptographic signature S is generated by an elliptic curve signature generation algorithm. Signatures generated in this manner can be as short as 170 bits. Once there is room to embed longer signatures, e.g. 240 bits and upwards it is possible to apply alternative short signature algorithms. When using an elliptic curve signature generation algorithm it is difficult to obtain a signature of a given desired length. It is feasible to create a look up table for all secure lengths up to e.g. 1024 bits. Accordingly the generated signature is made longer in a preferred embodiment by an arbitrary amount of bits by appending the original generated signature by the output of a pseudo random generator where as a seed the original signature is used.

When performing the embedding in a preferred embodiment a direct mapping algorithm is employed.

Figure 5:
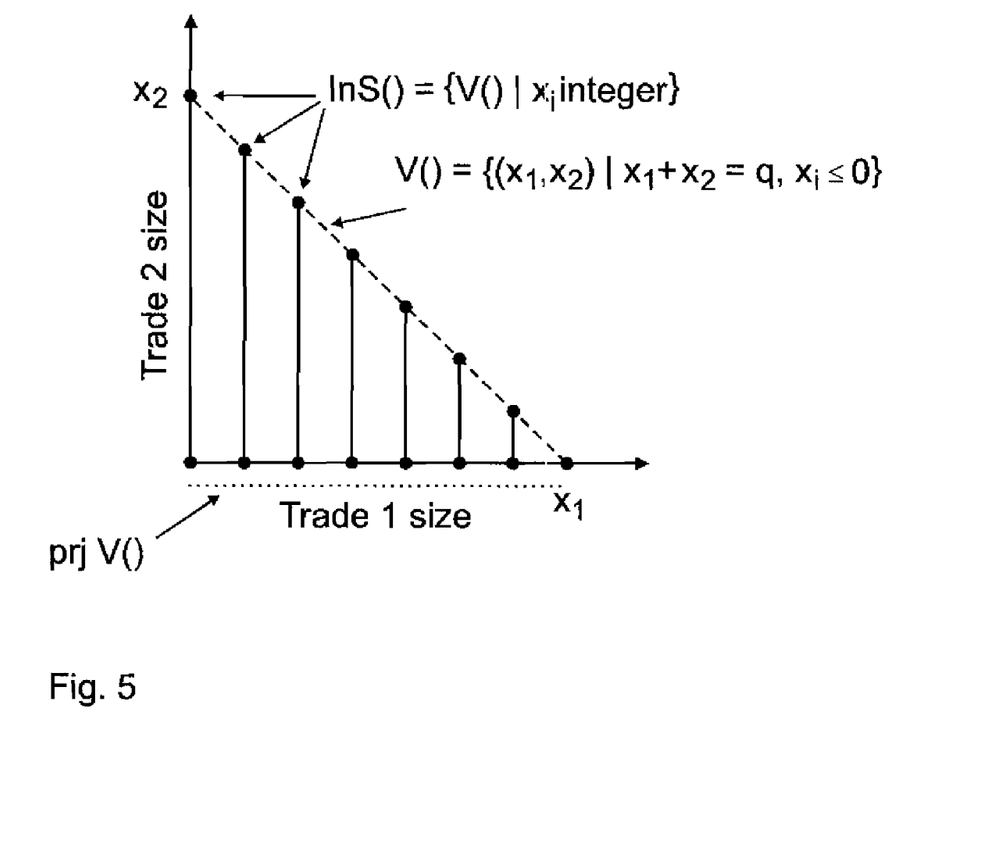
FIG. 5 shows a diagram for illustrating using a multiple trade created space for embedding a identity marker according to the present invention.

FIG. 5 shows an example of how using multiple trades creates a space for embedding a signature. In the shown example two trades are used having an aggregated quantity that sums up to the original order size q. All the points of the diagonal dotted line V preserves the total order size q exactly. The number of visible solutions INS is equal to the number of integer points on the diagonal V which is related to the projection of the diagonal V onto a sub-space, i.e. prjV( ). The anonymous trade order is broken into two trades X1, X2 to sum up to the original quantity q. If a trader wants to trade for example a quantity q=1,000,000 shares there are log 2q=19 bits available for embedding. This is the available space INS. The space INS is related to the length of the diagonal line V and specifically to the length of the projection onto a relevant subspace. The feasible space lies on the integer coordinates of n dimensional simplices, i.e. multidimensional analogues of triangles. A specific embedding is an ordered set of integers that are coordinates of the embedded number. To carry out a scheme an ordered set of trades has to be placed in the market. This can be accomplished simply by successively submitting the trades. It is possible to wait until each trade has appeared before submitting the next trade. Other market participants are able to observe the ordering by means of the time-stamp of each order. When performing the method according to the present invention individual order quantities xi now are visible to the participants and also the time stamp of each trade order is visible.

In the following an example of automatically linking an anonymous electronic trade order with an identity of a trader is given.

Assume that the desired trade order is a buy order for buying a quantity of q=1,000,000 shares and the trader's identity is i=12345. The desired trade order is split into n=10 trade orders. 10 split trade orders are generated randomly with a minimum order size of qmin=1,000 and a maximum order size of qmax=200,000 such that the total equals a quantity q=1,000,000 by the method according to the present invention:

| | |
|---|---|
| #1 | 33500 |
| #2 | 48824 |
| #3 | 169048 |
| #4 | 92472 |
| #5 | 131931 |
| #6 | 67018 |
| #7 | 52726 |
| #8 | 88991 |
| #9 | 144074 |
| #10 | 171,416 |
| Total | 1,000,000 |

After having calculated the order sizes of the split orders 1 to 10 the trade numbers of split orders and the identity of the trader are signed into, for e.g. a number 1034304523042567367 that can then be placed on an alternate channel.

A signature number as the identity marker of the trader is embedded into the given order as it is worked within separate trade orders. The number of bids bits available for embedding this number is calculated when the original order of size q is broken into n trade orders. In a preferred embodiment each trade is larger than a minimum size qmin and smaller than a maximum size qmax. A total quantity traded with the split and trade orders must be within x percent of the trade quantity q. The number n defines the dimension of the space.

Definition 1. An n-simplex S(n) in Rn is the convex hull of a set of n affinely independent points.

Definition 2. The regular n-simplex RS(n) is $\{(x_1, \ldots, x_n) \in R^n | \Sigma_i x_i = 1 \text{ and } x_i \geq 0 \forall i\}$.

Theorem 1. The number of integer points, InS(n,q), in the n-simplex defined by the equations $$\sum_{i=1}^{i=n} x_i = q, x_i \geq 0,$$

where $q \geq 0$ is an integer, is:

$$InS(n, q) = \frac{(q+n-1)!}{q!(n-1)!} \quad (1)$$

For comparison the ((n−1)-dimensional) volume of the regular n-simplex is $$\text{Volume}(RS(n)) = \sqrt{n}/(n-1)! \quad (2)$$

and the (n-dimensional) volume between the regular n-simplex and the origin, i.e. of $$\left\{xi \left| \sum_{i=1}^{i=n} x_i \leq 1, 0 \leq x_i \right.\right\},$$

is $$\text{Volume}(RS(n) \text{ to origin}) = 1/n! \quad (3)$$

If all trades are restricted to be greater or equal to qmin shares then this is equivalent to replacing q by q−nqmin because each of the n trades has size qmin so the only space available is in the rest. This number is labeled InSr(n,q,qmin)

$$InSr(n,q,qmin) = InS(n, q-nqmin) \quad (4)$$

To calculate the bits available, i.e. log 2(InSr) it is convenient to take Stirling's approximation $(q! \approx q^q e^{-q}\sqrt{2\pi q})$ for the terms involving q but not n! which is generally relatively small, i.e. the number of trades executing the strategy is expected to be around 1000 or less. Thus $$InSr(n, q, q_{min}) \approx \quad (5)$$

$$\frac{e^{1-n}}{(n-1)!}(q-nq_{min})^{-(1/2+q-nq_{min})} \times ((n-1)+(q-nq_{min}))^{-1/2+q+nq_{min}}$$

The number of bits available is BSr(n,q,qmin)=log 2(InSr(n,q,qmin)). Approximating log 2(q!) as qlog 2q−qlog 2e (error is less than 1% for q≥100) gives:

$$BSr(n, q, q_{min}) \approx \quad (6)$$

$$\frac{1}{\log(2)}((1-n-(q-nq_{min})\log_e(q-nq_{min}) + ((n-1)+(q-nq_{min}))$$

$$\log_e((n-1)+(q-nq_{min})) - \log_2((n-1)!)$$

The number of bits available for non-zero x, i.e. total of the trades within x % of the order size q which is BwSr(n,q,x,qmin) is:

$$BwSr(n,q,x,q_{min}) \approx BSr(n+1, q(1+x), q_{min}) - BSr(n+1, q(1-x), q_{min}) \quad (7)$$

Imposing an upper limit qmax on the trade sizes gives a more complex space available calculation because the limits interact when qmax<q/2. There are n separate n-dimensional geometrical regimes as qmax moves between the values qmax/k=q, k=1, . . . , k=n. Each new regime is characterized by the number of extreme points for the simplex which is simply $$C_k^n$$

because at most k coordinates can be at qmax. Of course at intermediate values of qmax one of the extreme coordinates is q−k×qmax.

Theorem 2. The volume, V(q,n,k), of the truncated n-simplex defined by the equations $$\sum_{i=1}^{i=n} x_i = q,$$

$0 \leq x_i \leq q/k$, where k and q/k are integer, is:

$$V(q, n, k) = \frac{n}{n-1}(V(q-\tfrac{q}{k}, n-1, k-1)H_1(q,n,k) + V(q,n-1,k)H_0(q,n)) \quad (8)$$

where $$H_1(q, n, k) = \sqrt{\left(\frac{q}{n}\right) - \left(\frac{q}{k}\right) + (n+1)\left(\frac{q}{n} - \frac{(k-1)q}{(n-1)k}\right)} \quad (9)$$

$$H_0(q, n) = \frac{q}{\sqrt{n(n-1)}} \quad (10)$$

and $V(q, n, 1) = qn-1$ Volume $(RS(n))$
If $k \geq n$ then $V(q, n, k) = 0$

Using these two Theorems and Equations 2 and 3 one arrives at a bound on the number of integer points in the truncated simplex. This is the space available for embedding an identity marker given that an order size q is carried out in n trades with a bound on the maximum trade (bid or offer) size.

The number of integer points (InS(n, q, k), in the truncated n-simplex defined by the equations $$\sum_{i=1}^{i=n} x_i = q,$$

$q/k \leq xi \leq 0$, where q, $k \geq 0$ are integer, is:

$$\frac{V(q, n, k)}{\sqrt{n}} \leq InS(n, q, k) \leq \frac{V(q, n, k)}{\sqrt{n}} \frac{InS(n, q/(n-1))}{RS(q/(n-1), n)} \quad (11)$$

Figure 6:
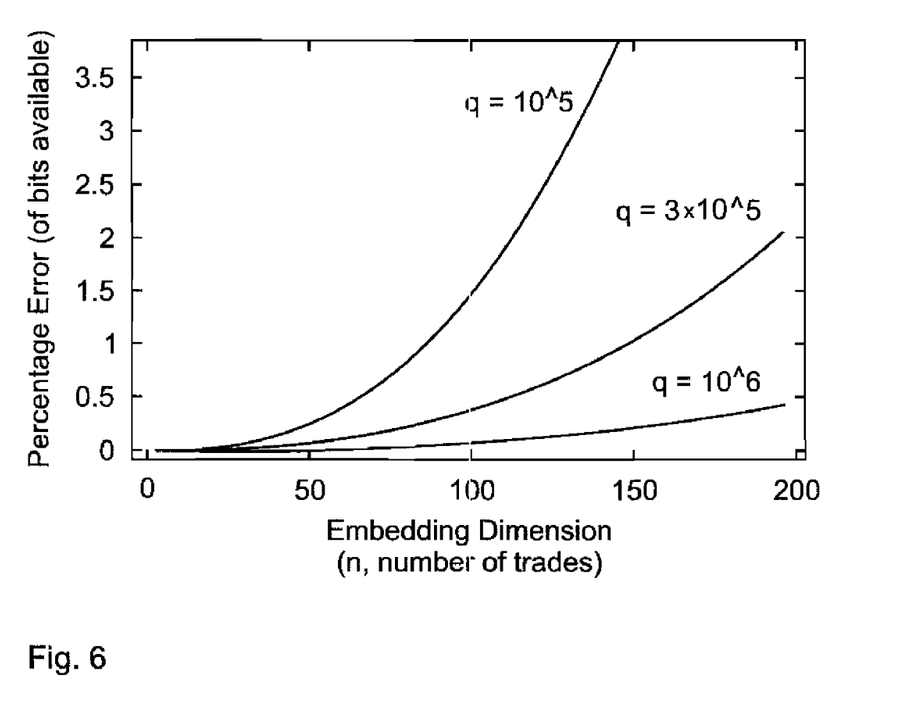
FIG. 6 shows worst case error bounds on a number of bids available for embedding an identity marker according to the present invention.

Note that one can calculate the exact number of integer points in the truncated simplex if one takes into account the surface, i.e. the n−2 volume and then corrects that for the intersections of the n−2 faces, etc. However, the bounds above are sufficient for estimating the size of the feasible region in bits for the values of n of interest, i.e. up to around 100 (bids or offers). This ranges from about 1.5% 1.5% for order volume $q=10^5$ shares down to 0.2 0.2% for order volume $q=10^6$ with $n \leq 100$ bids or offers as can be seen from FIG. 6.

It is possible to calculate how many bits are available for embedding identity markers.

Figure 7:
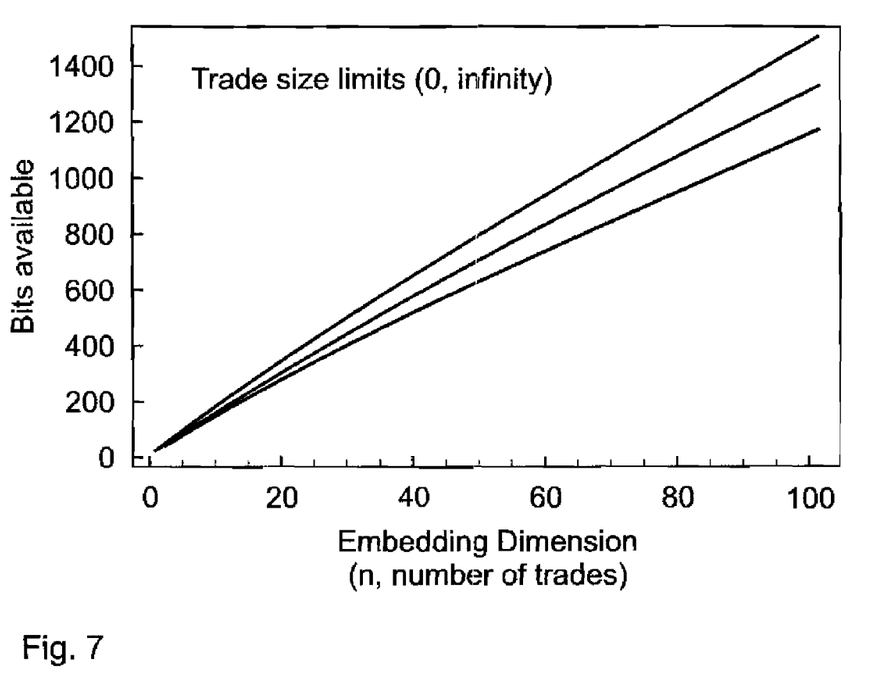
FIG. 7 shows a number of bids available for embedding an identity marker relative to the number of trades used to execute an order when no limits are placed on individual trade sizes.

FIG. 7 shows the number of bits available when splitting an order into up to 100 pieces with no limits on the size of individual orders, except that the number be positive. Trades for negative numbers of share are not considered, i.e. either short selling or simply trading on both sides of the book at the same time, although this is theoretically possible. For trades of interesting size to institutional traders q=105 to 106 it is just possible to obtain 1024 bits with 100 trades. This is at the limit of practicality at best. For more realistic sequence sizes, say 20 to 30, 200 to 300 bits are available. Hence short signature schemes are a necessity of the signature is to be embedded.

Figure 8:
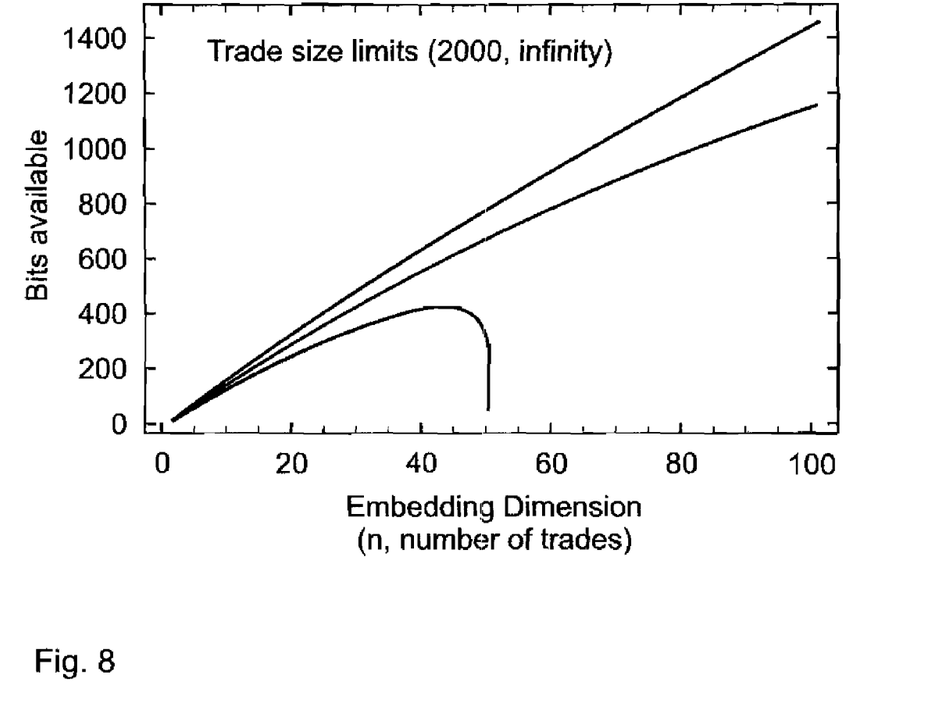
FIG. 8 shows a number of bids available for embedding an identity marker relative to the number of trades used to execute an order when a fixed size lower limit for an order is imposed.

Imposing a lower limit on individual trade sizes, FIG. 8, of qmin=2000 (a very typical trade size) has only a limited effect on realistic trade sequence sizes of 20 to 30.

Figure 9:
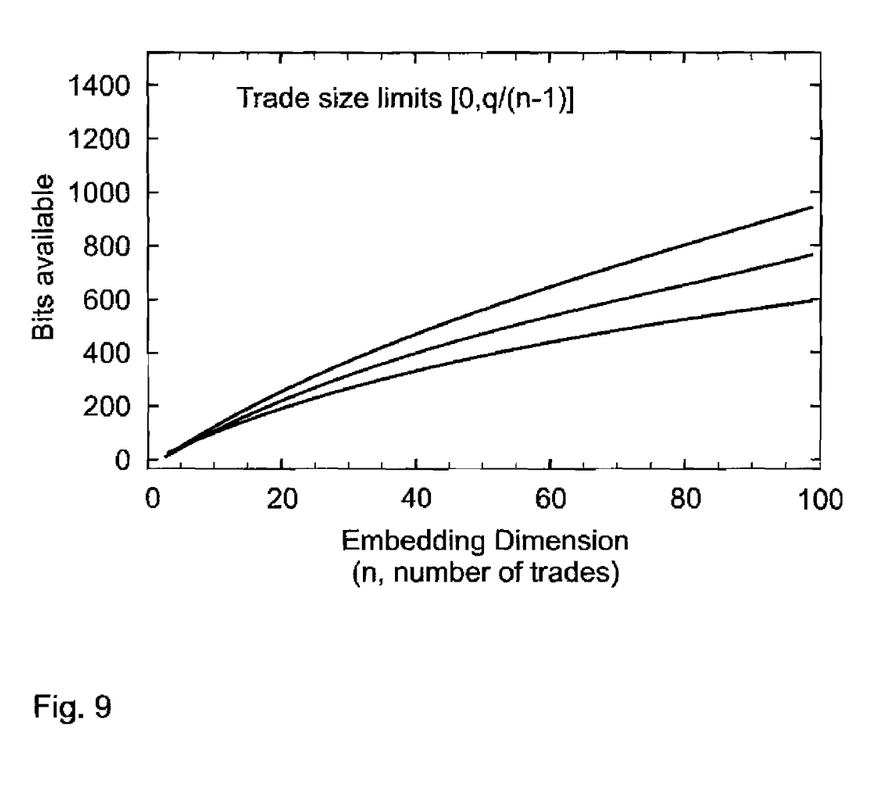
FIG. 9 shows a number of bids available for embedding an identity marker relative to the number of trades used to execute an order when a lower limit for an order is imposed.

A "tight" upper limit is shown in FIG. 9 choosing qmax=q/(n−1). For this limit the number of bits available drops by roughly half.

Interestingly, examining FIGS. 8 and 9 suggests that the effects of imposing limits on trade sizes is quite limited in terms of space lost. Space available increases dramatically with small percentage-q moves away from q/n.

To embed a signature S one needs a direct mapping from the number to the space. When a random number is embedded one can use a constructive method.

It is required that the space available is greater than or equal to the range of possible signature-numbers. The mapping is preferably 1-to-1 (onto) so that there is a unique set of trades for each signature-number.

A mapping from a signature-number S to a location in an n-simplex is performed. For example a mapping to a triangle in 3-space with the vertices being at permutations of 0,0, q is considered. Let m be a location on one of the coordinate axes. The plane m=q contains exactly one point, so if the signature-number to be embedded is zero (assuming that the signature-number to be mapped ranges between 0 and InS(n, q)−1)) this point can be chosen. Now one considers the number of integer points contained between (including on) the planes m=q and m=q−a. This is a triangle with vertices (0,0, a) shifted by q. Thus, the number of points contained is InS(n, a). Hence, if the signature-number is in [0, InS(n, a)] its first coordinate (breaking symmetry WLOG) is $\leq a$, otherwise it is $\geq a$. This reasoning can be repeated for each coordinate in turn. This gives an algorithm with a worst case running time O(qn) because in the worst case the last point is desired and one walks along each coordinate.

In the following an O(log(log(q))n) direct mapping algorithm s→InS(n,q) is described where n, q are known and the trade sizes xi; of the split orders are calculated.

Require: n>0, q>0, $s \geq 0$; note that x is not a coordinate.
Set i=0, m=n+1, x(0)=0
Repeat
Set i=i+1, S=s−x(i−1), m=m−1
Set 1=[log 2(s)]
Solve log(InS(m, s)=1 for s by a bisection method
Set x(i)=[s]
until i=n This algorithm loops n times and the main calculation in each loop is solving log(InS(m, s)=1 by a bisection method which takes log(log(q)) steps in the worst case. Note that InS(m, s) is a strictly increasing function of s since InS(m, s+1)=InS(m, s)/s and (m+s)/s>1 over the range of interest, i.e. $m \geq 1$. Also note that the second finite difference is strictly decreasing. Hence a bisection method always works.

There are many different ways to generate n random numbers $q \geq xi \geq 0$ that sum up to q. If upper and lower bounds are required rejection sampling can be employed. That is, a sample from a Regular Simplex is taken, each value is scaled by q−n×qmin, qmin is added and the results is rounded to the nearest integer. If all the resulting numbers satisfy the upper bounds the point is accepted. This produces uniform sampling but is only as efficient as the ratio between the sampled volume and V( ) This can be quite low but only one point is obtained so efficiency is not important.

The identity-linking method for provable trading embeds an identity marker into the order without changing the number of shares in the order. This is done by splitting the order size q into a number of trades ($x_i$, i=1 ... n) whose sum equals the order size q and exploiting the space created. This space is described by a simplex in n-dimensions satisfying $\Sigma x_i = q$. For order sizes of interest to upstairs traders (100,000 shares and upwards) the method creates enough space to embed an identity-link of around 200 bits with a small number of trades, i.e. 20-30. In fact provided both lower and upper bound on trades sizes are some (short in % q) distance from q/n, i.e. (order size)/(number of trades), then these can be chosen fairly freely without significantly affecting the embedding space available.

Another use and benefit of provable linkage is a real time validation of investor orders to brokers. That is, online verification of how and when brokers execute investor orders.

The method according to the present invention for automatically linking an anonymous electronic trade order having a given order quantity q to an identity of trader is very resistant to attacks, i.e. intentional unwanted changes.

Suppose that two orders with exactly the same quantity are present, arriving at roughly the same time. Note that even the original order placer cannot control the time-stamp so even they will be uncertain as to which order belongs to them. Given that a single order has b bits the chance is $2^{-b}$ that if one other order is submitted around the same time that the other single order has the same quantity. So attacker might simply place 2b orders systematically, at each possible price point. Furthermore the attacker could cancel all these orders on the timescale of time-stamp changes and resubmit them continuously. This would prevent a real reputation-motivated trader from using our identity linking scheme.

However this attack is not practical. Firstly if there is a charge for submitting a cancelled order that is greater than a very small fraction of the price improvement expected from non-informational trading then this attack has no economic gain. Secondly this attack is visible to the non-informational trader so it can be avoided by choosing an alternate venue. Thirdly, given the extreme increase in order flux it is likely that the stock exchange itself would take action against any trader creating so many unexecuted bids or asks.

There is also a potential indirect attack via free-riding. Given that on most exchanges trades must be done by time and price priority attackers can simply place large orders at all price points away from the current best bid and ask. These must be executed before later orders at worse prices.

However this attack is also not practical. Consider first the tick size, i.e. how many different price points are available. On many ECN's the tick is $1/1000$$, i.e. 0.1 US cents. An interesting range of prices is, say, 10 cents, so the attacker has 100 ticks at which to place orders. Secondly the attacker does not know when to attack and must have these ticks covered continuously during days of price movements. Most major stocks are highly traded and have significant price movements every day compared to the interesting range (e.g. around 10 cents). The attacker can continuously occupy this range with automated trade placement/cancellation and then benefit whenever our scheme is attempted because their trades must be executed first. Again, if trade placement/cancellation incurs costs this is unattractive. In addition the attacker must stay sufficiently away from the best bid or ask so as not to trade accidentally over potentially extended periods. This may be possible but is not attractive. Furthermore, this attack is visible and can be avoided by switching venue.

An attacker might wait until our scheme is attempted and then offer/bid volume at better prices (for counter-parties). A counter-party wishing to trade with the identified order that is in place would then have to trade through the attacker—including the attacker's volume too. However the counter-party seeking to deal with a particular identity will not trade with the attacker because the attacker does not have the identity which the counter-party is seeking to trade. Hence the attacker gains no economic benefit. Of course this kind of attack is also visible and can be avoided by switching venue.

Given that a direct attack is pointless an attacker could attempt to use timing. An attacker might wait until the scheme according to the invention is attempted and then attempt to time his order just as the counter-party intending to trade when the identified traders place their order (so the attacker would be invisible to the counter-party). However, doing this continuously (and cancelling) again would be visible so the attacker is limited to a small number of attempts. Given a system latency of 0.1 sec and a potential trading window of minutes to even hours the expected probability of success for the attacker is low, i.e. $1/600$ (one minute window) to $1/36000$ (one hour window).

Direct attacks against trader reputation are economically unattractive. Acting ahead of time to free ride is also unattractive. Free-riding, after the method is started, may be possible to a very limited extent but generally offers little or no economic benefit to the attacker.

In a preferred embodiment the method according to the present invention is performed by executing a software program in the calculating unit 2 as shown in FIG. 2.

The public keys and the identities of the participating traders are made available through a separate communication channel, e.g. placing the identities of the traders and the corresponding public keys on a website in the internet. From the orders visible in the electronic order book 6 a cryptographic signature S is derived from the order quantities q of the visible orders. It is checked whether the described cryptographic signatures constitute valid cryptographic signatures of a trader. In this manner it is possible to verify that an order has been placed by a specific trader. With the method according to the present invention it is possible for a trader to link a trade to himself. Principals who have instructed their agents to make certain trade orders can verify that these trades were carried out as instructed without having to trust to the evidence that is provided by the agents. In a preferred embodiment the desired trade is split into a minimum number of parts and the identity marker is embedded using the above described algorithm. In a preferred embodiment a public phrase such as "trade by XYZ for non informational purposes" is generated and made public along with the signature. In a preferred embodiment the public/private key pair is created. The pass phrase is signed like the set of split trade orders. The signature, the public key and the pass phrase are then published. Other participants can verify that a specific trader XYZ is the only trader capable of generating this specific trade order set. In a possible embodiment the split trade order set is published in the electronic order book 6 after it is placed in the order book.

Many extensions of the method according to the present invention are possible. It is for example possible to put a visible code in the trades. Also the geometry of this simplex space can be altered if desired.

The invention claimed is:

1. A method for automatically linking an anonymous electronic trade order having an order quantity (q) to an identity of a trader comprising the following steps:
   (a) receiving an identity marker of a trader;
   generating a cryptographic signature (S) by said trader using a private key of said trader;
   embedding said cryptographic signature (S) by splitting said anonymous trade order into a number (n) of shorter-bit-length trade orders having available bits and each having a corresponding order quantity x(i) to generate a trade order set by placing bits of the cryptographic signature in available bit locations of trade orders in said trade order set; and
   placing the generated trade order set in an electronic order book.

2. The method according to claim 1, wherein a public key and the identity of said trader is made available through a separate communication channel.

3. The method according to claim 1, wherein the public key and the identity of said trader is placed on a website.

4. The method according to claim 1, wherein the cryptographic signature is generated by an elliptic curve signature generation algorithm.

5. The method according to claim 1, wherein the embedding is performed by a direct mapping algorithm.

6. The method according to claim 1, wherein a cryptographic signature is extracted from the order quantities x(i) of the placed order set placed in the electronic order book to determine an identity of a trader for the trade order set.

7. The method according to claim 6, wherein it is checked whether the derived cryptographic signature is a valid cryptographic signature of the trader.

8. A computer program product for performing a method for automatically linking an anonymous electronic trade order having an order quantity (q) to an identity of a trader comprising the following steps:
   (a) receiving an identity marker of a trader;
   generating a cryptographic signature (S) by said trader using a private key of said trader;
   embedding said cryptographic signature (S) by splitting said anonymous trade order into a number (n) of shorter-bit-length trade orders having available bits and each having a corresponding order quantity x(i) to generate a trade order set by placing bits of the cryptographic signature in available bit locations of trade orders in said trade order set; and
   placing the generated trade order set in an electronic order book.

* * * * *